May 25, 1971          A. GUSTAFSON          3,580,788
APPARATUS FOR FORMING A TUBE FROM A TRAVELLING WEB
Filed Sept. 28, 1967
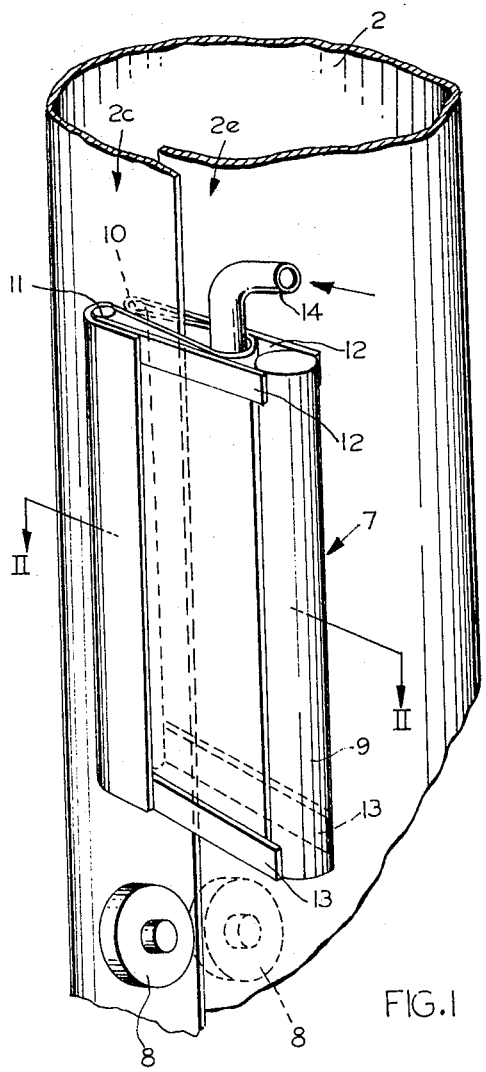
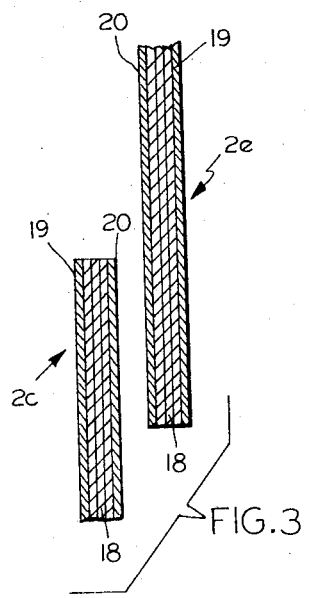
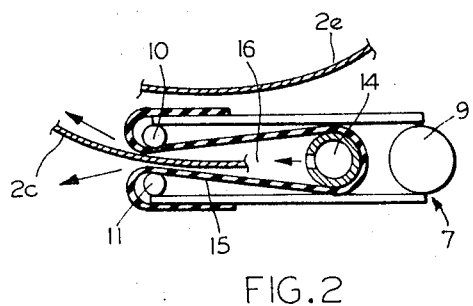
INVENTOR
AKE GUSTAFSON
BY Wenderoth, Lind & Ponack
ATTORNEYS

United States Patent Office 3,580,788
Patented May 25, 1971

3,580,788
APPARATUS FOR FORMING A TUBE FROM A TRAVELLING WEB
Ake Gustafson, Chatel-Saint-Denis, Switzerland, assignor to Tetra Pak AG, Zurich, Switzerland
Filed Sept. 28, 1967, Ser. No. 671,451
Claims priority, application Switzerland, Sept. 28, 1966, 13,998
Int. Cl. B32b 31/00
U.S. Cl. 156—497  1 Claim

ABSTRACT OF THE DISCLOSURE

A travelling web of material is formed into a tube with at least one of the longitudinal edges of the web passing through a heating means supplied with heated air. The two edges of the web are pressed together to form a welded seam after passing through the heating means. The heating means comprises a heating chamber having an internal lining of a non-adhering material. An air pipe opens into the chamber with means for supplying heated air. The lining is attached to the exterior surface of the heating chamber and is passed around the air pipe and has a vertical slit-shaped opening through which one edge of the travelling web can project into the interior of the heating chamber.

---

The present invention relates to the production of a tube from a web, such as a travelling paper web provided on one or both sides with a plastics coating.

Such a tube may be used for instance for the production of packages. To this end the web, e.g. a plastics coated paper web, is usually drawn off a supply roll at the foot of a machine and taken over a cylindrical guide roller located above. The guide roller deflects the travelling web downwards and, according to a method known in the art, the web is then pulled through a hollow cylinder in which it is formed into a tube. By the provision of transverse seams such a tube can be converted into packages, such as "Tetra packages," or it may be used for some other purpose.

Experience shows that the process of welding the overlapping longitudinal edges of the tube together to form a satisfactorily sealing longitudinal seam still presents difficulties that have not yet been overcome. Upon passing through a heating means in which the surface layer is intended to be softened, local overheating which is difficult to control often occurs and this may cause undesirable chemical changes in the plastics layer or layers. The manner in which the edges of the web that are to be bonded together run through the heating means is still a very critical factor.

The present invention seeks to eliminate these defects. The proposed method of producing a tube from a travelling web consists in first forming the web into a cylinder and in passing at least one of the longitudinal edges of said cylinder through a heating means which is supplied with heated air and the two edges are pressed together to form a weld seam after having passed through the heating means.

In this method the heating effect on the edges that are to be welded together can always be satisfactorily controlled and local overheating and consequent chemical changes in the web material can be avoided.

The invention also relates to apparatus for performing the above described method. This apparatus is characterised by a heating chamber through which at least one of the edges of the travelling web passes, the inside of said heating chamber being lined with a non-adhering material, an air pipe opening into said chamber and means to supply heated air to said pipe.

The invention will now be described, by way of example, with reference to the accompanying drawing, in which:

FIG. 1 is a perspective representation of a weld seaming device for seaming the longitudinal edges of a tube, FIG. 2 is a section of the heating chamber of the seaming device taken on the line II—II of FIG. 1, and FIG. 3 is a section of the two longitudinal edges of the tube that are to be welded together.

FIG. 1 shows a plastics coated web 2 that has already been formed into a tube of which the overlapping longitudinal edges 2c and 2e require to be bonded together by a weld seam. This is done in a weld seaming device which comprises heating means 7 and a pair of press rollers 8.

The heating means 7 serves for heating at least one of the edges 2c and 2e, causing the plastics coating to soften and to become tacky. The heating means 7 basically consists of a vertical bar 9 of circular cross-section, two parallel vertical tubes 10 and 11 made of thin gauge stainless steel and a pair each of upper and lower connecting strips 12 and 13. A hot air pipe 14 which communicates with a source (not shown) of hot air to provide a continuous supply of hot air to the heating means 7. The air pipe 14 projects from above into the space defined by the above mentioned parts. Both ends of a liner 15 consisting of a strip of non-adhering material and extending vertically along the entire length of the heating means 7 are attached to the outside faces of the connecting strips 12 and 13, whereas in the interior of the heating means the liner is taken around the hot air pipe 14 in such a way that the liner 15 encloses a heating chamber 16 in the interior of the heating means 7. One of the two edges 2c and 2e, in the illustrated example the edge 2c, of the travelling web 2 runs vertically down through this chamber 16, whereas the other edge 2e remains on the outside. Hot air continuously enters the chamber 16 through the hot air pipe 14, fans the edge 2c and transfers heat thereto before leaving the chamber through the frontal slit (cf. arrows). The plastics coatings on the edge 2c are therefore softened whilst the edge runs through the chamber. The edge 2c will therefore bond to the other edge 2e when the two edges together pass through the nip of the press rollers 8.

FIG. 3 is a detail drawing of the construction of the two overlapping edges of a web of plastics coated paper. A paper web 18 is sandwiched between two layers of plastics foil 19 and 20. In the present instance the plastics layers 19 and 20 on the edge 2c are softened, but only the layer 20 is used for making the bond with the cold layer 19 on the cooperating edge 2e.

Generally speaking it should be sufficient for the formation of a satisfactory weld seam to heat only one of the edges. However, in special cases it would be quite feasible to provide two heating chambers 16 and to heat up one of the edges in each of the chambers. Moreover, a single heating chamber 16 might be arranged to comprise two compartments disposed with their slit-shaped openings facing opposite ways and each adapted to receive one of the travelling edges.

In order to prevent the heated plastics layers from being dislodged, the liner 15 should consist of a non-adhering material, such as a polytetrafluoroethylene-glass fibre fabric. The tubular members 10 and 11 are made of very thin gauge material and they therefore absorb little heat. If desired, a cooling fluid could be passed through the same.

The complete heating means described above clearly has a very small thermal capacity and it cannot store significant quantities of heat. Consequently, the heating means can be put into operation at once without requiring a preliminary heating-up period. Conversely, the heating means cools rapidly after having been inactivated and no heat will therefore be transferred to the travelling web of material causing the same to stick undesirably once the hot air supply has been turned off.

The heating chamber 16 may be equipped with a thermostat for controlling the temperature of the inflowing hot air in accordance with the temperature already existing in the heating chamber.

The spacing of the two tubular members 10 and 11 and the disposition of the liner 15 at the vertical slit-shaped opening are preferably so chosen that the slit is not too wide in relation to the volume of hot air used. In order to ensure that the edges 2c of the travelling web which are not always exactly flat will pass smoothly down the narrow slit-shaped opening, which in extreme cases may be no wider than the web is thick, it is desirable to make the liner 15 resilient in the region of the slit-shaped opening to permit the same to adapt itself flexibly to irregularities in the flatness of the web. The required resilience can be easily provided for instance by thickening the material of the liner in the region of the slit.

At the top and bottom ends of the heating means the liner 15 is preferably drawn into the interior thereof in such a way that it prevents hot air from escaping at these points. The main volume of hot air is then forced to leave through the vertical slit-shaped opening.

I claim:

1. Apparatus for producing a tube from a travelling stiff web in the form of a cylinder comprising a heating chamber having an internal lining of polytetrafluoroethylene-glass fiber fabric, means for passing one of the longitudinal edges of said travelling web through said chamber, an air pipe having an opening in said chamber, means to supply heated air to said pipe to heat said chamber through said opening, said lining being attached to the external surface of said chamber and passed around said air pipe, said lining having a vertical slit-shaped opening through which one longitudinal edge of said travelling web projects into the interior of said heating chamber, a tube located on each side of said slit-shaped opening, means for cooling said tubes internally by a flowing cooling fluid, said lining in the region of said vertical slit-shaped opening being resilient to permit said lining to adapt itself to irregularities in the longitudinal edge of the travelling web.

References Cited

UNITED STATES PATENTS

| 2,289,618 | 7/1942 | Young | 156—282 |
| 2,403,995 | 7/1946 | Peters | 156—218 |
| 2,423,237 | 7/1947 | Haslacher | 156—497X |
| 2,796,914 | 6/1957 | Park | 156—282X |
| 3,136,675 | 6/1964 | Kuts | 156—203 |
| 3,408,242 | 10/1968 | Rochla | 156—282X |

SAMUEL W. ENGLE, Primary Examiner

U.S. Cl. X.R.

156—203, 466, 498, 499